3,410,787
AGRICULTURAL SPRAY OILS
Naci Frank Kubicek, Oakland, Calif., assignor to Shell Oil Company, New York, N.Y., a corporation of Delaware
No Drawing. Filed Dec. 1, 1965, Ser. No. 510,966
3 Claims. (Cl. 208—57)

ABSTRACT OF THE DISCLOSURE

Agricultural spray oils are produced by hydrocracking aromatic petroleum oils having an end boiling point above 700° F. and recovering a spray oil fraction having a low aromatic content and a 10% point above about 650° F. and a 90% point below about 750° F.

---

This invention relates to spray oils and a process for making them.

Petroleum oils have long been used agriculturally as insecticide sprays for the control of certain types of insects affecting orchards and for the control of the eggs of these insects during certain periods of the year. These spray oils are generally referred to in the agricultural trade as "dormant oils" and "summer oils." Spray oils are used alone or are formulated with auxiliary additives designed to produce specific toxic, spreading, emulsifying, or other qualities.

In spray oil preparations, it is obviously desirable that the product shall have a controlling effect on the insects and yet be as harmless as possible to human beings, domestic and wild animals, plants and to equipment used in the applications. Conventional spray oils which meet these requirements are the paraffinic or naphthenic oils which are quite low in aromatic and unsaturated compounds. Paraffinic oils are generally regarded as being superior to the naphthenic oils and narrow boiling fractions are generally more effective than wide boiling fractions. Thus, the trend in spray oils for control of insects is towards highly refined narrow boiling fractions from paraffinic type crudes. Such oils are particularly desired for spraying fruit trees, especially citrus trees.

In addition, it is anticipated there will be increasing usage of spray oils for controlling insects since the use of synthetic insecticides has been placed in a less favorable position by popular but controversial publications. Means to produce spray oils in volume from low quality hydrocarbon fractions without resorting to a high degree of refining obviously would be of benefit to the petroleum refiner.

It is now been found that high boiling aromatic hydrocarbon fractions can be converted into highly paraffinic fractions effective as an agricultural spray oil by a hydrocracking conversion reaction conducted in the presence of hydrogen at an elevated temperature and pressure by means of a catalyst comprising a hydrogenation-dehydrogenation component in combination with an active acid-acting cracking component. High boiling spray oil fractions containing less than 10% v. aromatics and preferably less than 5% v. aromatics can be prepared by the process of the invention.

The feeds which are usefully employed in the practice of this invention are hydrocarbon distillates having a substantial proportion of hydrocarbons boiling in and above the boiling range of the spray oil fraction to be recovered. In hydrocracking, the reaction is primarily a conversion of the feed into lower boiling hydrocarbons with little or no conversion to hydrocarbons boiling higher than that of the feed. In general, the end point of the feed will normally be above about 700° F., and preferably above about 800° F., but below about 1100° F. (ASTM D-1160). Hydrocarbon distillates having an end point in the range from about 800–1100° F. are especially suitable. The initial boiling point of the feed can vary over a wide range including temperatures above and below the boiling range of the spray oil fraction to be recovered. In general, initial boiling point of the feed will be above about 350° F. and preferably above about 500° F. Representative feeds are the heavy cracked cycle oils including catalytic cracked cycle oils, thermal cracked cycle oils, coker distillates and the like, and straight-run distillate fractions such as straight-run heavy gas oils, straight-run flashed distillates, and including the deasphalted oils obtained by solvent extraction of residual material with light hydrocarbon solvents such as propane, butane, pentane and the like to remove asphaltic compounds. Straight-run feeds are preferred as they are somewhat less aromatic and have longer alkyl side groups than the catalytic cracked cycle oils. The high boiling feeds are aromatic in nature and generally contain over 20% v. aromatics, usually over 30% v. aromatics.

Catalysts employed for hydrocracking the high boiling hydrocarbon distillates comprise a hydrogenation-dehydrogenation component in combination with an active cracking component. Broadly speaking, the hydrogenation-dehydrogenating component of the catalyst can comprise one or more of the metals, and their oxides or sulfides, in Groups I–B, II–B, V, VI, VII, and VIII of the Periodic Table. Particularly suitable components are the metals, copper, silver, chromium, molybdenum, tungsten, cobalt, nickel, platinum, palladium or rhenium and their oxides and sulfides. The hydrogenation-dehydrogenation component generally comprises from about 0.5% to about 25% by weight of the catalyst.

The cracking component can be selected from a variety of solid acidic materials having cracking activity. In general, it is preferred to employ an acid-acting refractory oxide such as halogenated aluminas, alumina-boria, and siliceous compounds, including for example, composites of silica-alumina, silica-magnesia, silica-alumina-zirconia, silica-titania-zirconia, activated clays, as well as synthetic metal alumino silicates (including the synthetic crystalline zeolites normally referred to as molecular sieves). Particularly suitable siliceous cracking components are the synthetically prepared amorphous silica-alumina compositions having a silica content in the range of from about 50% to about 90% by weight. The cracking component can be further activated by the incorporation of small amounts (e.g., 0.1–5% by weight) of promoters such as halogens, e.g., fluorine.

Hydrocracking catalysts can be prepared in any suitable manner. It is conventional to prepare synthetic cracking catalysts by co-precipitating silica with alumina, magnesia and the like, or by precipitation of silica followed by precipitation of alumina, magnesia and the like on the precipitated silica. The hydrogenation-dehydrogenation component can be combined with the cracking component in any suitable manner such as coprecipitation, ion-exchange or by impregnation. A preferred method is to incorporate the hydrogenation-dehydrogenation component into a hydrogel of the refractory oxide, such as silica-alumina hydrogel, by ion-exchange. Ion-exchange is the preferred method when the acidic cracking component is a crystalline zeolite.

In general, activity and life of most hydrocracking catalysts are adversely affected by nitrogen compounds. Since feeds of the type described above normally contain a substantial proportion of sulfur- and nitrogen-containing compounds, it is generally preferred to subject the hydrocarbon distillate to a hydrogen treatment to reduce the nitrogen content thereof. This can be effected by contacting the hydrocarbon distillate along at least about 500 standard cubic feet (s.c.f.) of hydrogen per barrel of distillate with a hydrogenation catalyst, preferably sulfur resistant, at temperatures from about 450° to 800° F., pressures of 500 to 1500 p.s.i.g. or even higher, and liquid hourly space velocities of from about 0.5 to 10. Hydrogenation catalysts are well known in the art and usually comprise one or more metals of Group VI–B or Group VIII, or their oxides or sulfides. In general, the hydrogenation component is supported on a refractory oxide, the amount of the hydrogenation component ranging between about 2 to 25% by weight based on the total catalyst. Conventional supports include alumina, silica-alumina and the like, with or without promoters such as boria, fluorine and the like. A representative hydrogenation catalyst comprises molybdenum oxide in combination with cobalt oxide and/or nickel oxide supported on alumina, or silica-alumina. Nickel-tungsten sulfide, with or without a support such as silica-alumina and the like is also a suitable catalyst.

Hydrogenation of the feed is not only advantageous for removing nitrogen-containing impurities but also because it tends to saturate aromatics which are then more susceptible to conversion into paraffins in the hydrocracking reaction. In addition, if desired, a substantial degree of cracking, e.g., up to 30–40% or more can be effected in the hydrogenation step. Consumption of hydrogen in the hydrogenation step is usually in the range from about 300–1500 standard cubic feet per barrel of feed.

The hydrocarbon distillate feed, preferably after a hydrogenation as described above, is subjected to hydrocracking at a temperature of about 550° to 850° F., a pressure of about 500–3000 p.s.i.g., a liquid hourly space velocity in the range from about 0.5 to 5 volumes of liquid feed per volume of catalyst per hour and from about 1000 to 15,000 standard cubic feet of hydrogen per barrel of feed. The consumption of hydrogen in the hydrocracking reaction is appreciable and usually ranges between about 500 and 2000 standard cubic feet per barrel of feed. Occasionally, higher or lower hydrogen consumption may be obtained. In conventional refinery operations, hydrocracking severity is usually adjusted to provide a conversion to gasoline (boiling below 420° F.) of at least 20% v. per pass or more. In general, relatively high conversions, i.e., 40% v. or more are preferred in the present process.

Effluent from the hydrocracking reaction is subjected to a conventional separation sequence to recover desired fractions. Unused hydrogen is generally recycled to the hydrocracking reaction zone. The liquid hydrocarbons are fractionated to recover conventional fractions such as a high octane $C_5/C_6$ gasoline fraction, a naphtha fraction boiling from about 180–220° F. to 350–420° F., which is suitable for further octane improvement by catalytic reforming, and frequently a distillate fraction boiling in the range from about 350 to 525° F., which is suitable for jet fuel. In the usual practice, material boiling above the jet fuel fraction is normally recycled to the hydrocracking zone or to a conventional catalytic cracking zone for further conversion. In accordance with the present process, at least a portion of the high boiling recycle is fractionated further to obtain fractions suitable for spray oils. Surprisingly, the high boiling tail of the hydrocracking recycle material is highly paraffinic and contains very little aromatic hydrocarbons, especially tetra-aromatics. In particular, a fraction having a 10% point above about 650° F. and a 90% point below about 750° F. and preferably below about 700° F. (ASTM D–1160) is recovered as a paraffinic spray oil fraction. A highly suitable fraction boils in the range from about 650 to 700° F. If desired, this paraffinic spray oil cracked fraction can be subjected to conventional refining treatment such as with concentrated sulfuric acid and/or an adsorbent treatment such as a clay treatment to remove additional aromatic compounds, and particularly, the polycyclic aromatic compounds. The fractions may also be subjected to a suitable dewaxing process to improve pour point of the finished spray oil.

Example

Starting material for this example was a heavy catalytically cracked cycle oil of 23° API gravity and containing 1.3% w. sulfur, 516 p.p.m./w. nitrogen, and 39% v. aromatics. This material was hydrotreated at 1500 p.s.i.g., 1.3 LHSV (liquid hourly space velocity) $9H_2$/oil mole ratio and a temperature of about 690° F. The catalyst was 2.4% w. cobalt, 9.2% w. molybdenum on silica-alumina cracking catalyst (approximately 25% w. $Al_2O_3$, 75% w. $SiO_2$).

The hydrotreated oil, boiling from 370° F. to 730° F. (95% ASTM) and containing 25 p.p.m./w. nitrogen, and 35% v. aromatics, was subjected to hydrocracking at 1500 p.s.i.g., 0.67 LHSV, 15/1$H_2$/oil mole ratio, at a temperature adjusted as necessary to provide a conversion of 67% w. The hydrocracking catalyst was a dual function catalyst of approximately 3% w. nickel, 2.5% w. fluorine, and silica-alumina (about 25% w. $Al_2O_3$, 75% w. $SiO_2$). The nickel had been incorporated into the catalyst by ion-exchanging nickel ions into a fluorine-containing hydrogel of the silica-alumina. This operation was on a once-through basis with no recycle. Product from the once-through hydrocracking operation was distilled into various fractions, including gasoline and higher boiling fractions. The 635–662° F. fraction contained only 5% aromatics. The fraction boiling above 662° F. was quite low in aromatic content, i.e., only 10 millimoles of aromatics per 100 grams of oil of which only 3 millimoles per 100 grams were polyaromatics.

At a hydrocracking temperature of 612° F., recycle (material boiling above 420° F.) was charged to the unit together with the hydrotreated feed, the combined feed rate being 1.5 (ratio of fresh hydrocracker feed plus recycle to fresh hydrocracker feed). Product from the recycle operation was distilled into various fractions. Upon analysis, the 635°–667° F. fraction is found to contain less than 7% v. aromatics. The fraction boiling above 667° F. contained only 22 millimoles of aromatics per 100 grams of oil, of which 9 millimoles per 100 grams of oil were polyaromatics. Lower boiling fractions contained appreciably more aromatics.

It is to be recognized that while spray oil fractions of extremely low aromatic content are obtained from the highly aromatic and refractory cycle oils, other conditions can be used to obtain spray oils of even lower aromatic content. For example, more severe operations in the hydrotreating step to obtain more hydrogenation of the oil to reduce the nitrogen content of the hydrocracker feed to a very low level, e.g., 1 p.p.m./w. or less would be beneficial. The use of a hydrocracking catalyst having a stronger hydrogenation function, e.g., tungsten in combination with the nickel, or a noble metal hydrogenation function, could be advantageous. Too, less refractory aromatic feeds such as straight-run heavy gas oils and/or flashed distillates, would be desirable.

I claim as my invention:

1. A process for producing agricultural spray oil fractions comprising hydrocracking high boiling petroleum fractions having a distillation end point above about 700° F. and an aromatics concentration above about 20% v. in the presence of hydrogen and a hydrocracking catalyst at a temperature of about 550 to 850° F., a pressure of about 500–3000 p.s.i.g., a liquid hourly space velocity in the range of from about 0.5–5 volumes of liquid feed per volume of catalyst and from about 1000 to 15,000 standard cubic feet of hydrogen per barrel of feed, and recovering from the hydrocracking product a spray oil fraction having a 10% distillation point above about 650° F. and a 90% distillation point below about 750° F., a total aromatics content of less than about 10% v.

2. The process according to claim 1 wherein the petroleum fraction is subjected to a catalytic hydrogenation prior to said hydrocracking.

3. The process according to claim 2 wherein the hydrocracking is effected with a nickel-containing acid-acting refractory oxide catalyst.

References Cited

UNITED STATES PATENTS

| | | | |
|---|---|---|---|
| 2,945,801 | 7/1960 | Ciapetta et al. | 208—111 |
| 3,132,086 | 5/1964 | Kelley et al. | 208—57 |

OTHER REFERENCES

"Petroleum Products Handbook," Guthrie, McGraw-Hill Book Co., New York, 1960, Sec. 11, pages 42 and 43.

DELBERT E. GANTZ, *Primary Examiner.*

A. RIMENS, *Assistant Examiner.*